(12) United States Patent
Kafuku et al.

(10) Patent No.: US 10,803,844 B2
(45) Date of Patent: Oct. 13, 2020

(54) INFORMATION PROCESSING DEVICE, INFORMATION PROCESSING METHOD, STORAGE MEDIUM, AND ELECTRONIC MUSICAL INSTRUMENT

(71) Applicant: CASIO COMPUTER CO., LTD., Shibuya-ku, Tokyo (JP)

(72) Inventors: Shigeru Kafuku, Akishima (JP); Nobuyuki Mochinaga, Kokubunnji (JP); Atsushi Shibutani, Tokorozawa (JP); Toshihiko Otsuka, Ome (JP); Atsushi Inoshita, Akiruno (JP); Hiroko Okuda, Kokubinnji (JP); Takashi Umemura, Hokuto (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 45 days.

(21) Appl. No.: 16/203,393

(22) Filed: Nov. 28, 2018

(65) Prior Publication Data

US 2019/0164529 A1    May 30, 2019

(30) Foreign Application Priority Data

Nov. 30, 2017    (JP) ................. 2017-230588

(51) Int. Cl.
  *G10H 1/36*    (2006.01)
  *G10H 1/38*    (2006.01)
  *G06T 13/80*    (2011.01)
(52) U.S. Cl.
  CPC ............. *G10H 1/368* (2013.01); *G06T 13/80* (2013.01); *G10H 1/383* (2013.01);
  (Continued)

(58) Field of Classification Search
  CPC .. G10H 1/368; G10H 1/383; G10H 2210/066; G10H 2210/081; G10H 2210/091; G06T 13/80
  (Continued)

(56) References Cited

U.S. PATENT DOCUMENTS 4,539,882 A * 9/1985 Yuzawa ................... G10H 1/36
                                                                84/610
4,614,983 A * 9/1986 Usami ..................... G10H 1/005
                                                                360/137

(Continued)

FOREIGN PATENT DOCUMENTS

JP            H07098582 A    4/1995
JP            H0844353 A     2/1996
              (Continued)

*Primary Examiner* — David S Warren
*Assistant Examiner* — Christina M Schreiber
(74) *Attorney, Agent, or Firm* — Holtz, Holtz & Volek PC

(57) ABSTRACT

For example, provided is an information processing device with which the entire performance can be felt really visually. The information processing device TB according to the present invention includes a processor performing a reception process of receiving input of performance information including pitch information, a first image output process of outputting a first image according to the received performance information, a performance determination process of determining at least any of tonality, a chord type, and a pitch name on the basis of the received performance information, and second image output process of outputting a second image according to a result determined in the performance determination process.

15 Claims, 8 Drawing Sheets

(52) U.S. Cl.
CPC . *G10H 2210/056* (2013.01); *G10H 2210/066* (2013.01); *G10H 2210/081* (2013.01); *G10H 2210/091* (2013.01)

(58) Field of Classification Search
USPC .......................................................... 84/462
See application file for complete search history.

(56) References Cited

U.S. PATENT DOCUMENTS

| | | | | |
|---|---|---|---|---|
| 5,048,390 | A * | 9/1991 | Adachi | G10H 1/0008 84/464 R |
| 5,208,413 | A * | 5/1993 | Tsumura | G10H 1/361 434/307 A |
| 5,504,269 | A * | 4/1996 | Nagahama | G09B 15/003 84/453 |
| 5,760,325 | A * | 6/1998 | Aoki | G10H 1/383 84/613 |
| 6,225,545 | B1 * | 5/2001 | Suzuki | G09B 15/023 84/464 R |
| 6,898,759 | B1 * | 5/2005 | Terada | G10H 1/0066 345/473 |
| 2002/0121180 | A1 * | 9/2002 | Kondo | G10H 1/0008 84/609 |
| 2003/0110925 | A1 * | 6/2003 | Sitrick | G10H 1/365 84/477 R |
| 2011/0185881 | A1 * | 8/2011 | Okuda | G10H 1/38 84/613 |
| 2011/0185882 | A1 * | 8/2011 | Okuda | G10H 7/00 84/622 |
| 2012/0172121 | A1 * | 7/2012 | Migitera | A63F 13/44 463/31 |
| 2013/0077447 | A1 * | 3/2013 | Hiratsuka | G10H 1/368 367/199 |
| 2013/0104724 | A1 * | 5/2013 | Soejima | G09B 15/003 84/467 |
| 2013/0199357 | A1 * | 8/2013 | Soejima | G09B 15/00 84/467 |
| 2014/0260915 | A1 * | 9/2014 | Okuda | G10H 1/38 84/613 |
| 2015/0228270 | A1 * | 8/2015 | Okuda | G10H 1/42 84/609 |
| 2017/0330543 | A1 * | 11/2017 | Liu | H04N 5/2621 |
| 2018/0047374 | A1 * | 2/2018 | Numata | G11B 27/10 |
| 2019/0164529 | A1 * | 5/2019 | Kafuku | G10H 1/383 |
| 2019/0348013 | A1 * | 11/2019 | Kubita | G10G 1/02 |
| 2019/0371288 | A1 * | 12/2019 | Gill | G06F 12/0862 |

FOREIGN PATENT DOCUMENTS

| | | |
|---|---|---|
| JP | H11224084 A | 8/1999 |
| JP | 3211839 B2 | 9/2001 |
| JP | 2008233576 A | 10/2008 |

* cited by examiner

INFORMATION PROCESSING DEVICE, INFORMATION PROCESSING METHOD, STORAGE MEDIUM, AND ELECTRONIC MUSICAL INSTRUMENT

CROSS-REFERENCE TO RELATED APPLICATIONS

This application claims the benefit of Japanese Patent Application No. 2017-230588, filed on Nov. 30, 2017, the entire contents of which are incorporated herein by reference.

BACKGROUND

1. Technical Field

The present invention relates to an information processing device, an information processing method, a storage medium, and an electronic musical instrument.

2. Related Art

For example, computer graphics moving image generation systems are known to move an image object, such as a dancer, in synchronization with the performance of music, such as a MIDI music, and generate not only the theme of the music but also a moving image changing integrally with the progression of the musical sound (see JP H11-224084 A).

Incidentally, it is difficult to really feel the whole state of musical performance merely by causing a character to dynamically appear during the performance.

The present invention has been made in view of such circumstances, and it is advantageous, for example, to provide an information processing device with which the entire performance can be felt really visually.

SUMMARY

An information processing device includes: a display; and a processor configured to execute the following processes: a reception process of receiving input of performance information including pitch information, a first image output process of outputting on the display a first image according to the performance information received in the reception process, a performance determination process of determining at least any of tonality, a chord type, and a pitch name on the basis of the performance information received in the reception process, a performance end determination process of determining whether performance ends, and a second image output process of outputting on the display a second image according to a result determined in the performance determination process when the end of performance is determined in the performance end determination process.

DETAILED DESCRIPTION

First Embodiment

Hereinafter, an information processing device TB according to a first embodiment of the present invention will be described with reference to the accompanying drawings.

Figure 1:
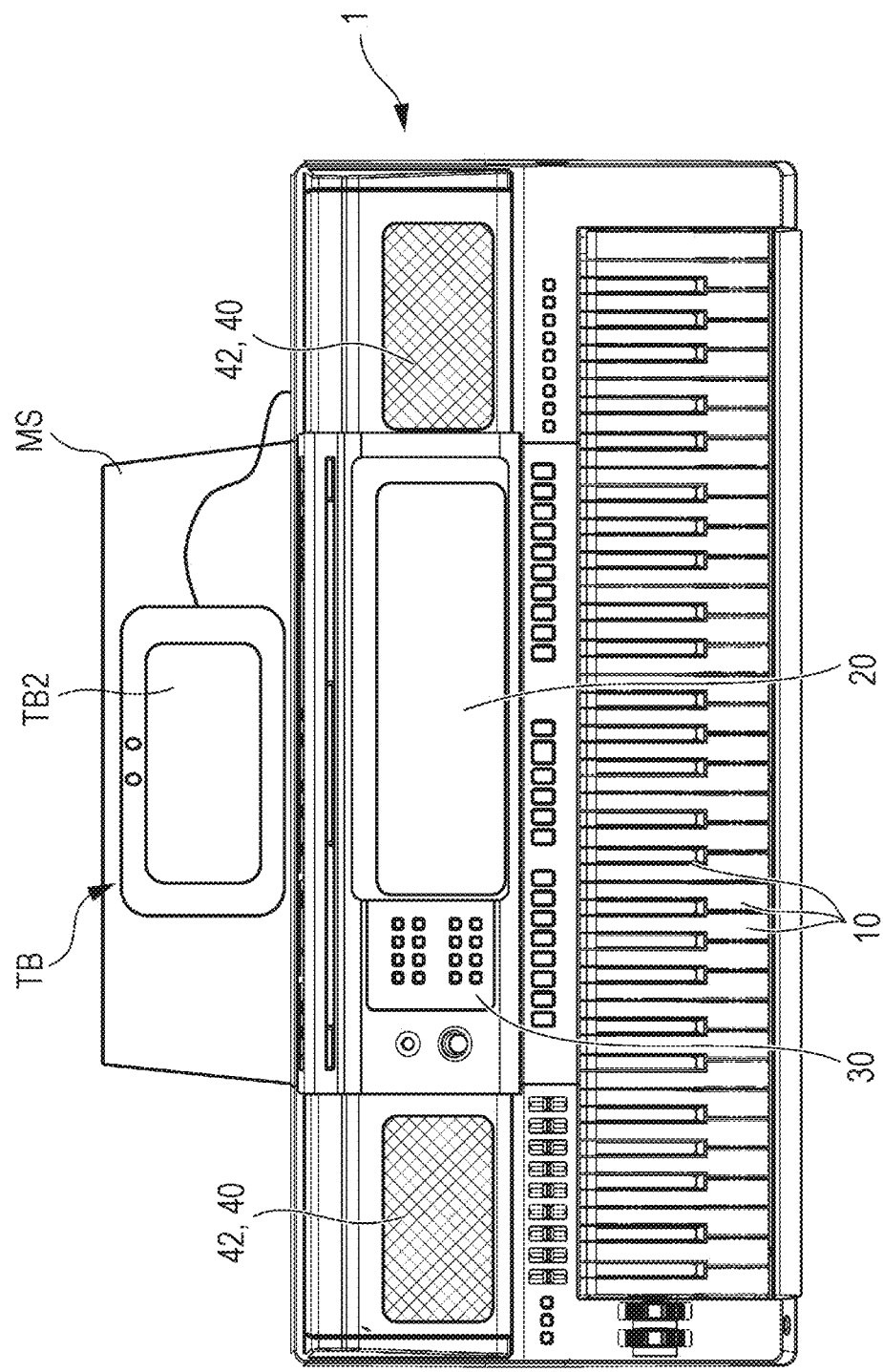
FIG. 1 is a diagram illustrating a state in which an information processing device according to a first embodiment of the present invention is connected to an electronic musical instrument.
Figure 2:
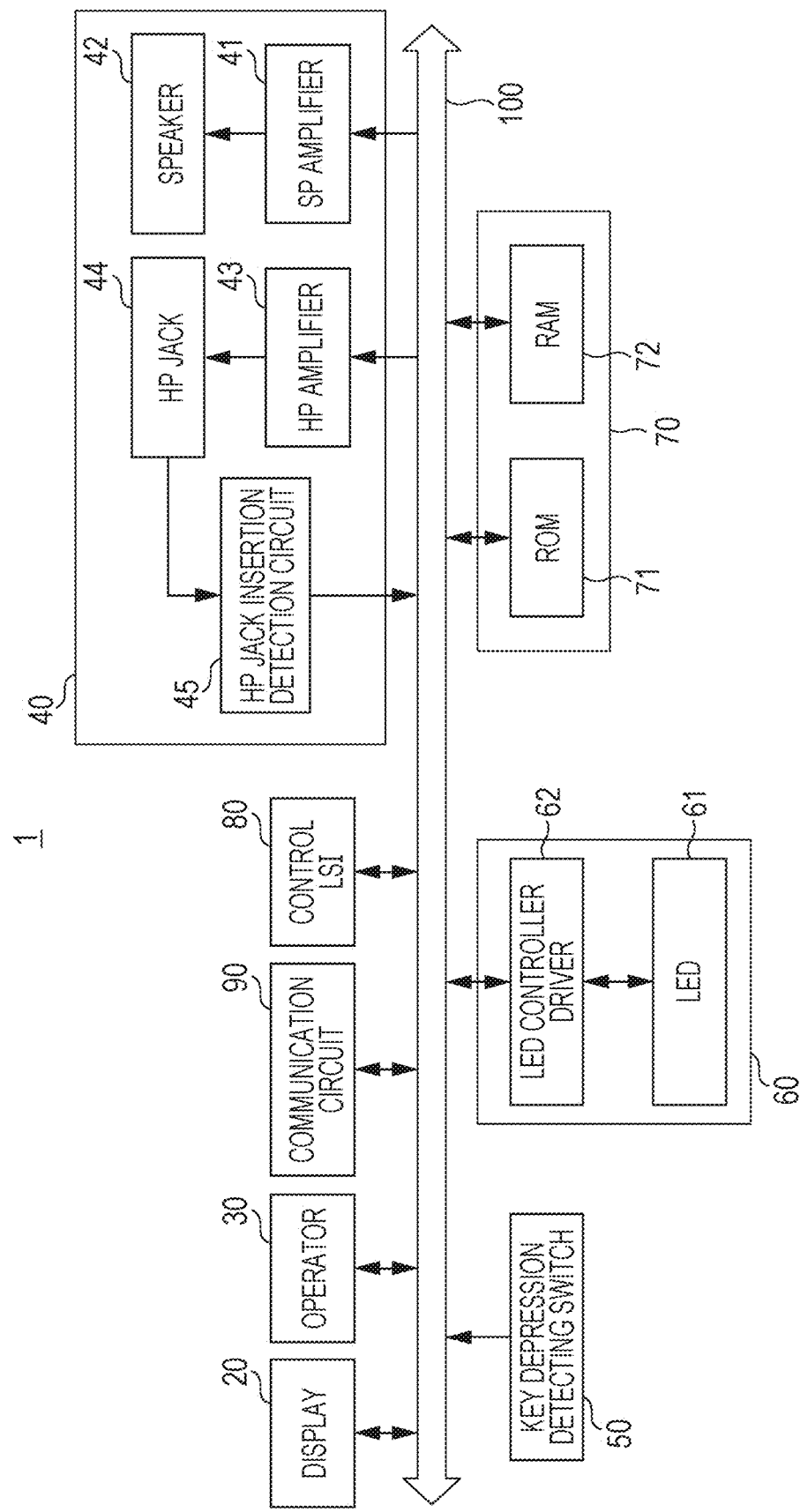
FIG. 2 is a block diagram of an electronic musical instrument connected to the information processing device according to the first embodiment of the present invention.
Figure 3:
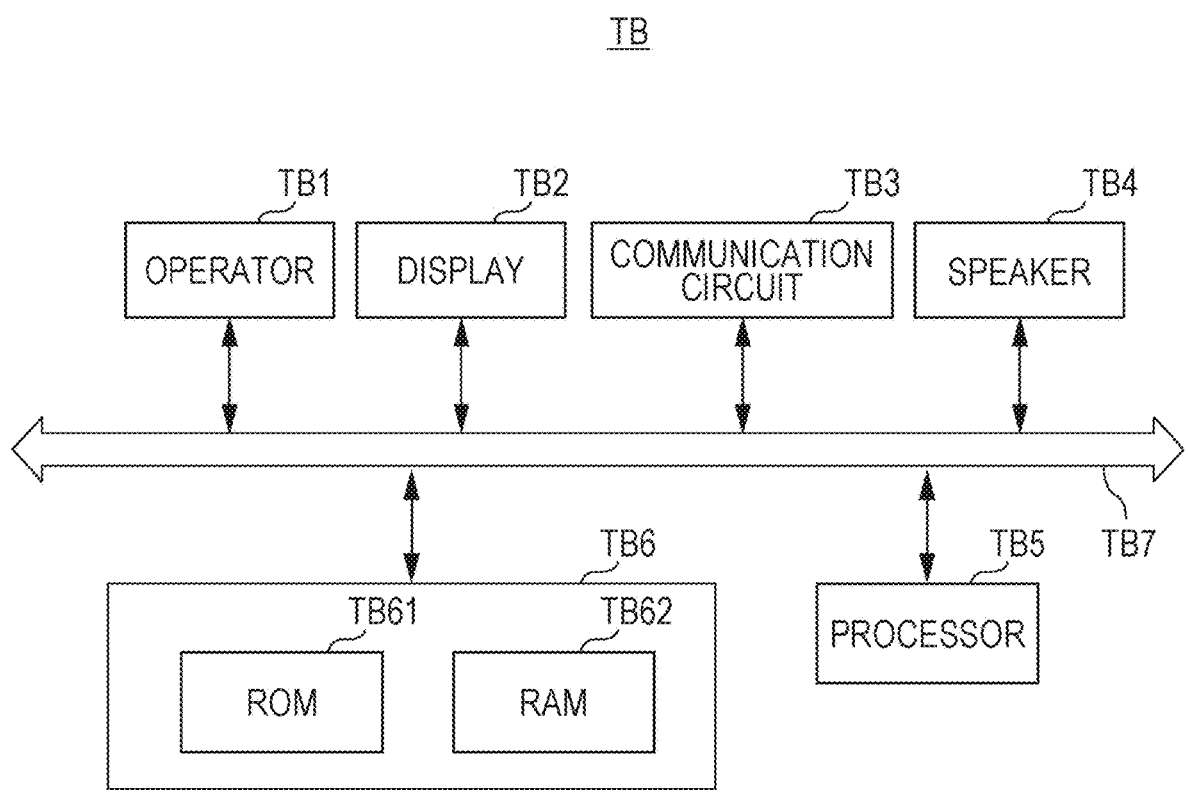
FIG. 3 is a block diagram of the information processing device according to the first embodiment of the present invention.

FIG. 1 is a diagram illustrating a state in which the information processing device TB according to a first embodiment is connected to an electronic musical instrument 1, FIG. 2 is a block diagram of the electronic musical instrument 1 connected to the information processing device according to the first embodiment, and FIG. 3 is a block diagram of the information processing device TB according to the first embodiment.

(Electronic Musical Instrument 1)

As illustrated in FIG. 1, the electronic musical instrument 1 to which the information processing device TB according to the present embodiment is connected is, for example, an electronic keyboard instrument, such as an electronic piano, a synthesizer, or an electronic organ.

The electronic musical instrument 1 includes a plurality of keys 10, a display 20, an operator 30, and a music stand MS, and in the present embodiment, the music stand MS is used to place the information processing device TB.

Furthermore, as illustrated in FIG. 2, the electronic musical instrument 1 includes a sound system 40, a key depression detecting switch 50, a key identifier (LED) 60, a memory 70, a processor 80, and a communication circuit 90.

Each of the keys 10 is an operator for a performer to designate a pitch, and when the performer depresses and releases the key 10, the electronic musical instrument 1 turns on and off a sound corresponding to the designated pitch.

The display 20 is a portion including, for example, a liquid crystal monitor with a touch panel to display a message in accordance with operation of the operator 30 by the performer.

In the present embodiment, since the display 20 has a touch panel function, the display 20 is configured to play a role of the operator 30.

The operator 30 is a portion having operation buttons for the performer to perform various settings and the like to perform various setting operations, such as sound volume adjustment.

A sound system 40 is a portion for outputting sound and includes an SP amplifier 41 (speaker amplifier), speakers 42, an HP amplifier 43 (headphone amplifier), an HP jack 44 (headphone jack) into which a plug of a headphone is inserted, and an HP jack insertion detection circuit 45 configured to detect insertion of the plug of the headphone into the HP jack 44.

When the plug of the headphone is inserted into the HP jack 44, the HP jack insertion detection circuit 45 detects insertion thereof, and sound is output to the HP jack, and conversely, when the HP jack insertion detection circuit 45 does not detect the insertion of the plug is not detected, sound is output to the speakers 42.

The key depression detecting switch 50 is a portion for detecting depression and release of a key 10, and, for example, a rubber switch is provided under each of the keys 10, and depression and release of the key is detected by the rubber switch.

The key identifier (LED) 60 is a portion, for example, for visually guiding performer's operation of the keys 10 when a lesson mode or the like is selected.

Specifically, the key identifier (LED) 60 includes an LED 61 disposed under each key 10 and an LED controller driver 62 for controlling lighting, extinguishing, and the like of the LEDS 61, and a portion of the key 10 facing the LED 61 is formed to transmit light therethrough.

The memory 70 includes a ROM 71 being a read-only memory and a RAM 72 being a readable/writable memory.

The ROM 71 stores, for example, control programs (for example, a program for a lesson mode program) executed by the processor 80, various data tables, and the like.

The RAM 72 is a storage area in which data, such as musical sound data and music data, corresponding to each key 10 are stored, and also serves as a temporary storage area into which data generated by the processor 80 and a control program are loaded during a performance.

The processor 80 is a portion for controlling the whole of the electronic musical instrument 1 and includes a control LSI.

Then, the processor 80 performs, for example, control for turning on a musical sound from the sound system 40 in response to depression of a key 10, and control for turning off a musical sound emitted from the sound system 40 in response to release of the key 10.

In addition, when a lesson mode is selected, the processor 80 also performs control or the like for causing the LED 61 to turn on and off via the LED controller driver 62 on the basis of MIDI data to guide the performer's operation of the keys 10.

The communication circuit 90 includes a wireless communication unit and a wired communication unit for performing communication with an external device, and in the present embodiment, the information processing device TB is wiredly connected to the communication circuit 90, and as described later, data is transmitted to the information processing device TB.

However, the communication circuit 90 is not necessarily limited to a circuit having only the transmission function but may be a circuit having a reception function as well.

The above-described units (the display 20, the operator 30, the sound system 40, the key depression detecting switch 50, the key identifier (LED) 60, the memory 70, the processor 80, and the communication circuit 90) are communicably connected with each other via a bus 100 so that necessary data are exchanged between the respective units.

(Information Processing Device TB)

Next, the information processing device TB will be described.

In the present embodiment, as illustrated in FIG. 1, the information processing device TB is a tablet mobile terminal, and an application for causing the display TB2 to display an image as described later is installed.

However, the information processing device TB is not necessarily limited to a tablet mobile terminal but may be a notebook PC or the like.

In addition, the information processing device TB may include a sequencer or the like for receiving a MIDI code from the electronic musical instrument 1 to reproduce music data.

As illustrated in FIG. 3, the information processing device TB mainly includes an operator TB1, a display TB2, a communication circuit TB3, a speaker TB4, a processor TB5, and a memory TB6.

The operator TB1 includes, for example, switches such as a power switch for turning on/off power.

The display TB2 includes a liquid crystal monitor with a touch panel to display images, and has a touch panel function to play a role of the operator TB1.

The communication circuit TB3 includes a wireless communication unit and a wired communication unit for performing communication with another device or the like, and in the present embodiment, the communication circuit TB3 is wiredly connected to the communication circuit 90 of the musical instrument 1 as described above, and receives data from the electronic musical instrument 1 as will be described later.

It is needless to say that the communication circuit TB3 is not limited to a circuit having only the reception function and may also have a transmission function.

The speaker TB4 is a portion for outputting sound, includes a sound system, an earphone jack, and the like, and has substantially the same configuration as that of the sound system 40 of the electronic musical instrument 1.

The processor TB5 is a portion for controlling the whole of the information processing device TB, and includes a processor to execute various processing in accordance with control programs stored in the memory TB6 and applications installed therein.

The memory TB6 includes a ROM (TB61) being a read-only memory and a RAM (TB62) being a readable/writable memory.

The ROM (TB61) stores, for example, control programs executed by the processor TB5, various data tables, and the like.

The RAM (TB62) is a storage area in which data necessary to operate a control program are stored, and also functions as a temporary storage area or the like into which data generated by the processor TB5, data transmitted from the electronic musical instrument 1, and an application are loaded.

The above-described components (the operator TB1, the display TB2, the communication circuit TB3, the speaker TB4, the processor TB5, and the memory TB6) are communicably connected via the bus TB7 so that necessary data are exchanged between the components.

Next, with reference to FIG. 4, which is a flowchart describing the operation of the information processing device TB, or the like, a more detailed description will be given.

In the following description, it is assumed that the communication circuit TB3 of the information processing device TB and the communication circuit 90 of the electronic musical instrument 1 have already been wiredly connected, and as will be described below, it is assumed that an application for causing the display TB2 to display an image.

When the user depresses a key 10 of the electronic musical instrument 1 for performance, the key depression detecting switch 50 detects the depression of the key 10.

When the depression of the key 10 is detected, the processor 80 (control LSI) of the electronic musical instrument 1 generates performance information (for example, note on including pitch information (note number, velocity, etc.) or the like) corresponding to the depressed key 10, and controls the sound system 40 to turn on a sound according to the performance information.

In contrast, when the user releases a depressed key 10, the key depression detecting switch 50 detects the release of the key 10.

When the release of the key 10 is detected, the processor 80 of the electronic musical instrument 1 generates performance information (for example, note off) corresponding to the released key 10, and controls the sound system 40 to turn off the sound corresponding to the performance information.

The performance information generated by the processor 80 of the electronic musical instrument 1 is transmitted from the communication circuit 90 of the electronic musical instrument 1 to the communication circuit TB3 of the information processing device TB.

Figure 4:
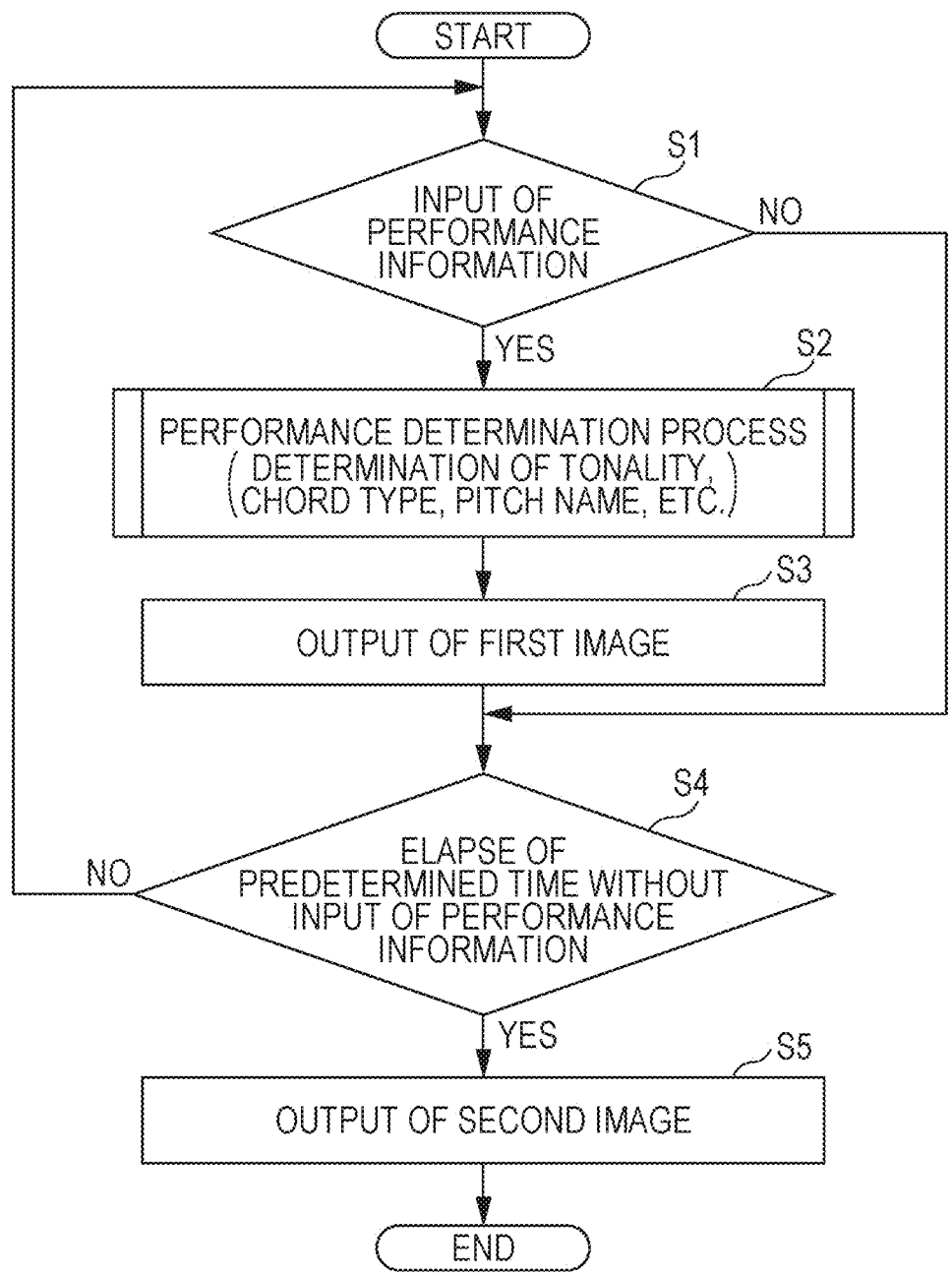
FIG. 4 is a flowchart illustrating the operation of the information processing device according to the first embodiment of the present invention.

As illustrated in FIG. 4, the processor TB5 of the information processing device TB determines whether performance information transmitted from the electronic musical instrument 1 is received by the communication circuit TB3 of the information processing device TB and the performance information is input (step S1). When there is no input of the performance information (step S1: NO), the process proceeds to step S4, and the processor 80 performs a performance end determination process.

Specifically, when a predetermined time has passed without input of the performance information (step S4: YES), that is, when reception of the performance information is not detected for a certain period of time, the processor 80 determines that the performance ends, the process proceeds to step S5 to perform a second image output process of outputting and displaying a second image, which is described later, on the display TB2, and the whole process is finished.

Furthermore, when the present invention is applied to an embodiment in which the performer specifies a melody while accompaniment data is automatically reproduced, the end of the automatic reproduction of the accompaniment data may be determined as the end of a performance so that the second image output process is performed. That is, the processor 80 may determine the end of a performance by the performer for any reason, and when the processor 80 determines the end of the performance by the performer, the second image output process is desirably performed.

Meanwhile, when the predetermined time has not passed without input of performance information (step S4: NO), the processor TB5 proceeds to step S1 again to determine whether the performance information is input.

When the performance information transmitted from the electronic musical instrument 1 is received by the communication circuit TB3 of the information processing device TB (step S1: YES), the processor TB5 performs a reception process of receiving the input of the performance information to perform a performance determination process in step S2.

More specifically, as a performance determination process in step S2, the processor TB5 determines, for example, tonality (for example, 24 keys from C major to *B minor*), a chord type (for example, Major, minor, sus, aug, dim, 7th, etc.), and a pitch name (for example, do, re, mi, etc.), on the basis of received performance information.

However, for the performance determination process, either one of determination of the tonality, determination of the chord type, and determination of the pitch name can be carried out, or conversely, in addition thereto, for example, syncopation, chord progression, or the like may be determined. Details of what kind of thing is specifically determined as the performance determination process according to the present embodiment will be described in the next step S3.

A method for determining tonality, a chord type, or the like can use, but is not particularly limited to, for example, a method disclosed in JP 3211839 B2 or the like, and the pitch name is determined on the basis of a note number or the like included in performance information.

After the performance determination process, the processor TB5 proceeds to step S3 to perform a first image output process (step S3) of outputting and displaying on the display TB2 a first image according to the performance information with timing of receiving the performance information.

Note that "with timing of receiving the performance information" means not "at the same time as" but "every time" the performance information is received.

In the present embodiment, a basic image stored in the memory TB6 is processed by computer graphics (CG) so that the first image is created and displayed on the display TB2, but the first image displayed on the display TB2 is not necessarily limited to an image obtained by such a technique and is desirably a first image according to the performance information.

FIGS. 5A to 5F are diagrams illustrating characters and the like used in the first image.

Figure 5A:
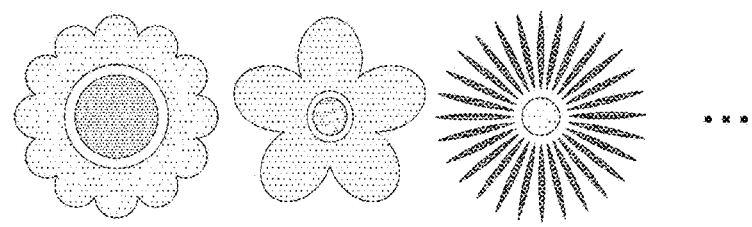
FIGS. 5A to 5F are diagrams illustrating characters and the like used in a first image according to the first embodiment of the present invention.

As illustrated in FIG. 5A, for a first character image to be output to the display TB2 in accordance with performer's operation for playing a melody, flower images of 12 kinds of flowers (flower patterns) corresponding to pitch names (scale) are stored in the memory TB6.

In FIG. 5A, three of the flower images of 12 kinds of flowers are illustrated.

Therefore, when a pitch name (scale) of the received performance information, more specifically a pitch name (scale) corresponding to a melody, is determined in the performance determination process (step S2), a flower image according to the pitch name (scale) of the received performance information is selected as a character used for the first image according to the performance information.

Then, the processor TB5 performs the first image output process (step S3) of creating the first image using the selected flower image as the first image according to the performance information, and outputting and displaying the first image on the display TB2.

A state of outputting and displaying the first image to the display TB2 will be described later.

Figure 5B:
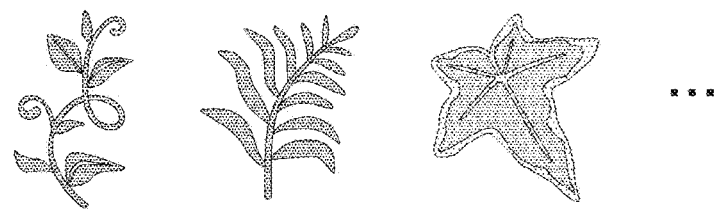

Furthermore, as illustrated in FIG. 5B, for the second character image output to the display TB2 in accordance with performer's operation for playing a chord (for example, a chord type, such as major, minor, sus, aug, dim, 7th), leaf images of ten kinds of leaves (leaf patterns) are stored in the memory TB6.

The first character image is a flower pattern, and the second character image is a leaf pattern. The first character image and the second character image are relevantly combined. In the present embodiment, the first character image is a flower pattern, and the second character image is a leaf pattern. However, as long as these images are relevantly combined and displayed simultaneously, what kind of images may be combined.

In FIG. 5B, three of the leaf images of ten kinds of leaves are illustrated.

Therefore, when the chord type of the received performance information is determined in the performance determination process (step S2), a leaf image according to the chord type of the received performance information is selected as a character used for the first image according to the performance information.

Then, the processor TB5 performs the first image output process (step S3) of creating the first image using the selected leaf image as the first image according to the performance information, and outputting and displaying the first image on the display TB2.

A state of outputting and displaying the first image to the display TB2 will be described later.

Figure 5C:
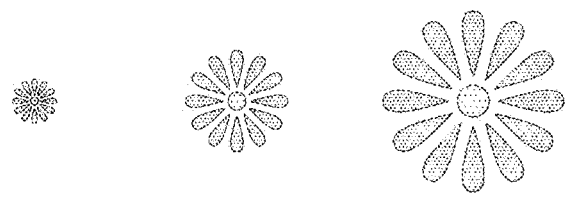

Furthermore, the velocity or the like (for example, sound volume, beat, etc.) of the received performance information is determined in the performance determination process (step S2), and as illustrated in FIG. 5C, a size of the character to be used for the first image according to the performance information is selected.

FIG. 5C illustrates that the size of the flower image as the character is reduced when the velocity thereof is small (a key 10 has a small key depression velocity and a weak sound (sound volume is small)), and the size of the flower image as the character is increased when the velocity thereof is large (the key 10 has a large key depression velocity and a strong sound (sound volume is high)). The same applies to the leaf image.

Therefore, the first image output process (step S3) of creating the first image and outputting and displaying the first image on the display TB2 by the processor TB5 outputs the first image with a size according to velocity information of the performance information.

Figure 5D:
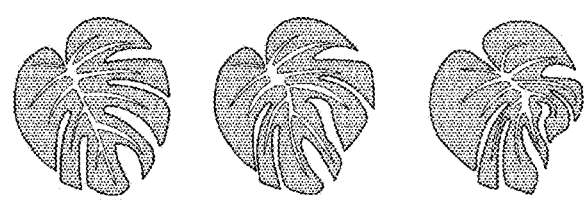

Furthermore, in the present embodiment, a syncopation and beat regularity or the like of the received performance information are also determined in the performance determination process (step S2), and as illustrated in FIG. 5D, the state of the character to be used for the first image according to the performance information is changed.

Note that FIG. 5D illustrates that when the syncopation is determined or beat irregularity is determined in the performance determination process (step S2), the shape of the leaf image of a leaf as the character is changed and deformed (see the right side of FIG. 5D).

Figure 5E:
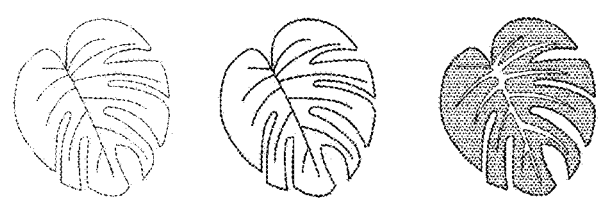

Furthermore, in the present embodiment, the correctness of chord progression and the beat regularity of the received performance information are also determined in the performance determination process (step S2), evaluation of playing music by the performer is further determined on the basis of the performance information, and further, as illustrated in FIG. 5E, the presence/absence or the like of a color (whether to be drawn or painted) of the character to be used for the first image according to the performance information is also selected.

Note that FIG. 5E illustrates that when the correctness of the chord progression and the beat regularity of the received performance information are determined to be wrong in the performance determination process (step S2), the leaf image as the character is changed to a drawing, and conversely, when the correctness of the chord progression and the beat regularity of the received performance information are determined to be right, the leaf image is changed to a painting.

Figure 5F:
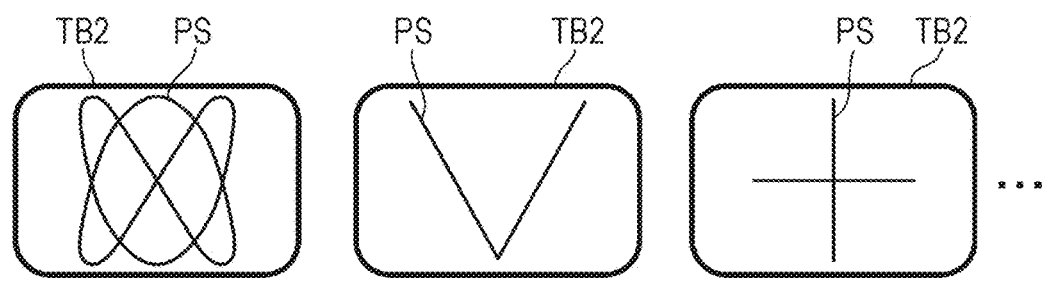

As illustrated in FIG. 5F, the position of the above character is determined to appear on the display TB2 of the information processing device TB in accordance with 14 kinds of trajectory patterns PS (three of the 14 kinds of trajectory patterns are illustrated in FIG. 5F) corresponding to chord progression, and the processor TB5 performs the first image output process (step S3) of creating the first image to which the character is applied to be located at that position and outputting and displaying the first image on the display TB2.

As described above, an output example of the first image showing how the first image is output in accordance with the timing of receiving the performance information will be described with reference to FIGS. 6A to 6D and 7A to 7C.

In this example, a description will be made of simultaneously depressing keys 10 corresponding to two "dos", that is, a certain "do" and another "do" an octave higher than the certain "do" corresponding to a melody by left hand fingers, and simultaneously depressing keys 10 corresponding to a "do, mi, and so" (major chord) two octaves higher than the certain "do by left hand fingers.

Furthermore, in the present embodiment, effects for a moving image is also made before and after output of the first image and an explanation is made including the presentation, but the present embodiment is not necessarily limited to performing such a presentation and at least the first image is desirably output.

However, the presentation before and after output of the first image increases the visual effect for the performer or the like. Therefore, the presentation is preferably made before and after output of the first image.

FIGS. 6A to 6D are diagrams illustrating the effects for the moving image added before output of the first image.

Note that the effects for the moving image proceed from FIG. 6A to FIG. 6D.

FIGS. 6A to 6D illustrate some images extracted from the moving image being displayed, and many images are output between the extracted images.

Figure 7A:
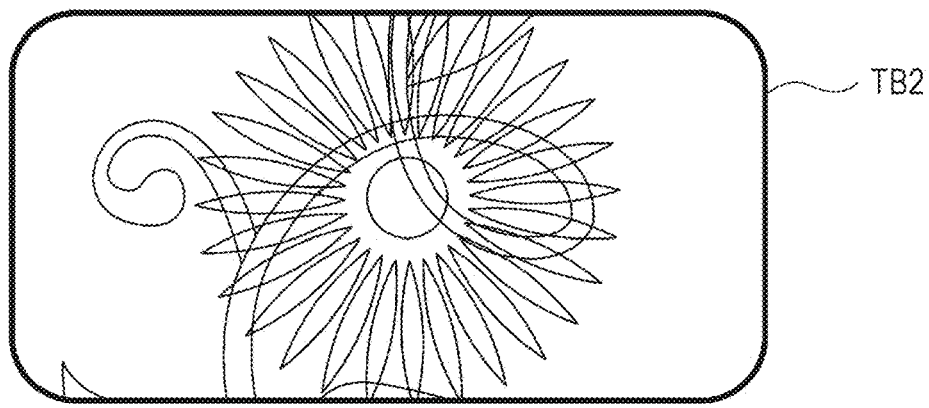
FIGS. 7A to 7C are diagrams illustrating output of the first image according to the first embodiment of the present invention and subsequent effects for a moving image.
Figure 7B:
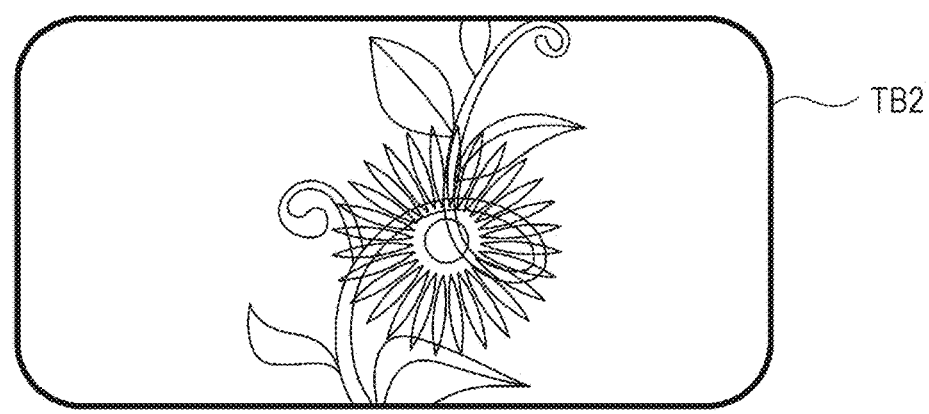
Figure 7C:
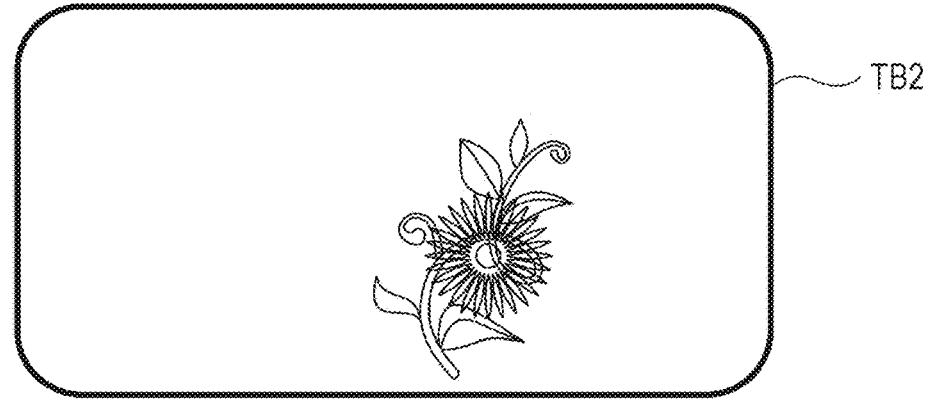

FIGS. 7A to 7C are diagrams illustrating output of the first image and subsequent effects for the moving image.

FIG. 7A is a diagram illustrating output of the first image, and FIGS. 7B and 7C are diagrams illustrating effects for a moving image after output of the first image.

In FIGS. 7A to 7C as well, as in the case of FIGS. 6A to 6D, the moving image proceeds from FIG. 7A to FIG. 7C, and FIG. 7A to FIG. 7C illustrate some images extracted from the moving image being displayed, and many images are output between the extracted images.

In addition, a screen transition time in FIGS. 6A to 7C is approximately a few seconds (two or three seconds).

Figure 6A:
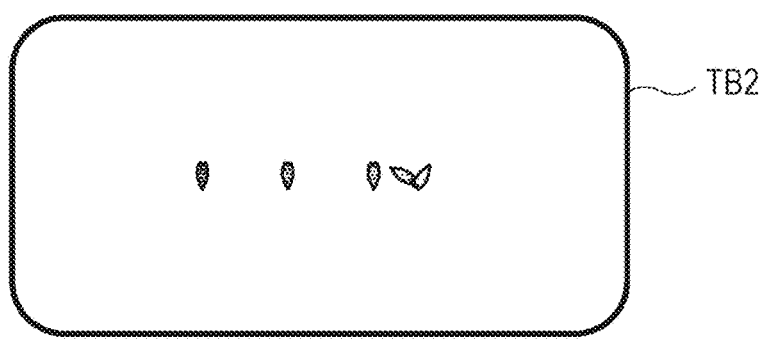
FIGS. 6A to 6D are diagrams illustrating effects for a moving image added before output of the first image according to the first embodiment of the present invention.

As illustrated in FIG. 6A, before outputting the first image, the processor TB5 firstly outputs to the display TB2 an image including five petal characters corresponding to five keys 10 depressed.

Specifically, the processor TB5 displays a petal corresponding to the certain "do" described above, in a color closer to "red" at the center in a vertical direction and on the leftmost side of the display TB2, and displays a petal corresponding to the "do" an octave higher, in "green" color to the right of the red petal.

Furthermore, the processor TB5 sequentially displays three petals corresponding to the "do, mi, and so" two octaves higher, in colors gradually changing from a green color to a blue color, to the right side of the green petal.

In this case, the color is selected according to the pitch, and the petal corresponding to the certain "do", which has a low pitch sound, is red, whereas a petal closer to a higher pitch sound has a color closer to the blue color.

In other words, in this example, a petal corresponding to "so", positioned on the rightmost side, of the petals corresponding to "do, mi, and so" two octaves higher is the closest to the blue color.

Furthermore, as seen in the above description, the position of each petal appearing in a horizontal direction is selected corresponding to the pitch.

Figure 6B:
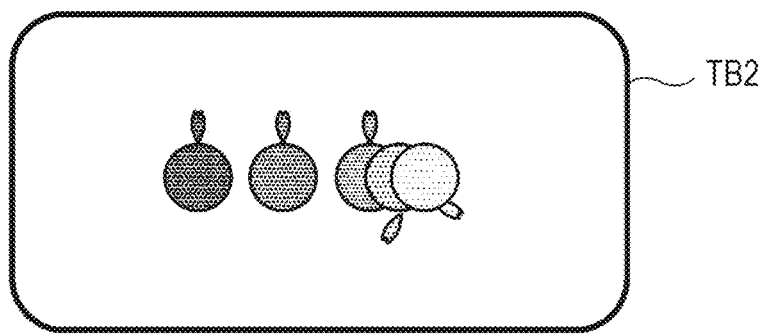

Next, as illustrated in FIG. 6B, the processor TB5 outputs to the positions of the five petals on the display TB2 an image including characters having a circular shape, the same colors as those of the petals, a size larger than those of the petals, and having the corresponding above petals.

Thus, the display TB2 displays which key 10 is depressed, in a more visible manner.

Figure 6C:
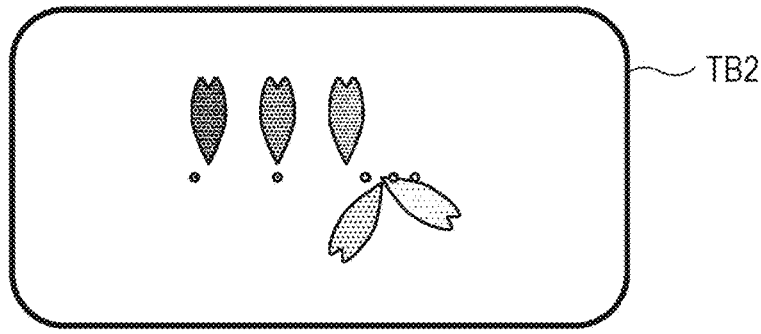
Figure 6D:
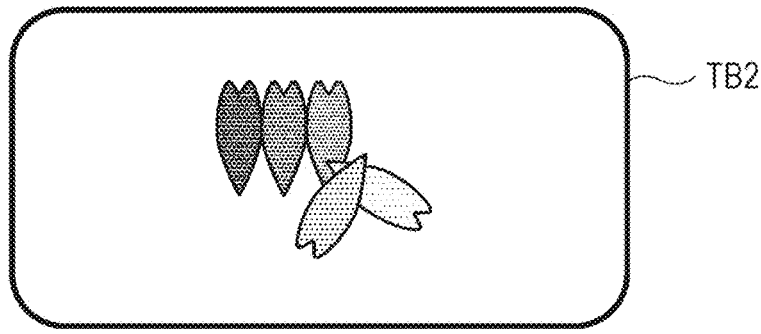

Furthermore, as illustrated in FIGS. 6C and 6D, the processor TB5 sequentially outputs on the display TB2 images in which the size of each circle is reduced so that the circle finally disappears and the size of each petal is increased.

At this time, the colors of the petals and the circles are the same as described above.

Then, as illustrated in FIG. 7A, the processor TB5 performs the first image output process (step S3) of outputting and displaying on the display TB2 the first image using a flower image according to "do" of a melody, and a leaf image according to a chord type (in this example, a major chord), which are created as the first image according to the received performance information.

In the first image, the size of a flower character and the size of a leaf character are determined on the basis of the velocity information and the like, as described above.

In FIG. 7A, the characters (the flower and the leaves) are drawn, but, as the performance progresses, the characters may be painted and further back ground color may be changed according to the beat regularity, the correctness of chord progression, or the like determined in the performance determination process (step S2). Color is selected according to the pitch, the tonality, the chord type, or the like determined in the performance determination process (step S2).

For example, color corresponding to the tonality has been proposed by Scriabin or the like, and such a color may be adopted as the background color. When major chords are often determined as the chord type in the performance determination process (step S2), for example, the color is preferably changed to a bright color (brightness is increased).

In contrast, when minor chords are often determined as the chord type in the performance determination process (step S2), for example, the color is preferably changed to a dark color (brightness is reduced).

However, such color processing is by way of example only, and the present invention is not limited to this.

As illustrated in FIGS. 7B and 7C, after outputting the first image illustrated in FIG. 7A, the processor TB5 reduces the sizes of the characters (the flower and the leaves) used in the first image so that when a subsequent first image according to subsequent performance information is output, the subsequent first image is not hidden by the first image previously output.

As described above, during the performance, the first image according to the received performance information is displayed on the display TB2 one after another so as to make the performance exciting.

When the drawings continue, the performer understands that he/she does not play music successfully, and as the performer develops his/her skills, the image is painted with vivid color. Therefore, such display on the display TB2 motivates the performer to practice playing music.

Then, the first images output in step S3 are all stored in the memory TB6, and when the performance ends and there is no further input of new performance information, the answer to step S4 is YES.

In other words, when reception of the performance information is not detected for a certain period of time in the reception process, the processor TB5 performs the performance end determination process of determining that the performance ends (step S4), when it is determined that the performance ends in the performance end determination process (step S4: YES), the process proceeds to step S5, and the second image output process of outputting a second image according to a result determined in the performance determination process (step S2) is performed.

In the present embodiment, since all the first images created as the results of determination of the performance determination process (step S2) are stored in the memory TB6 in order of output (in order of performance), the processor TB5 performs the second image output process (step S5) of creating a second image according to a result determined by the performance determination process (step S2) by using all the first images, and outputting and displaying the second image on the display TB2, and a series of processes are finished.

Figure 8:
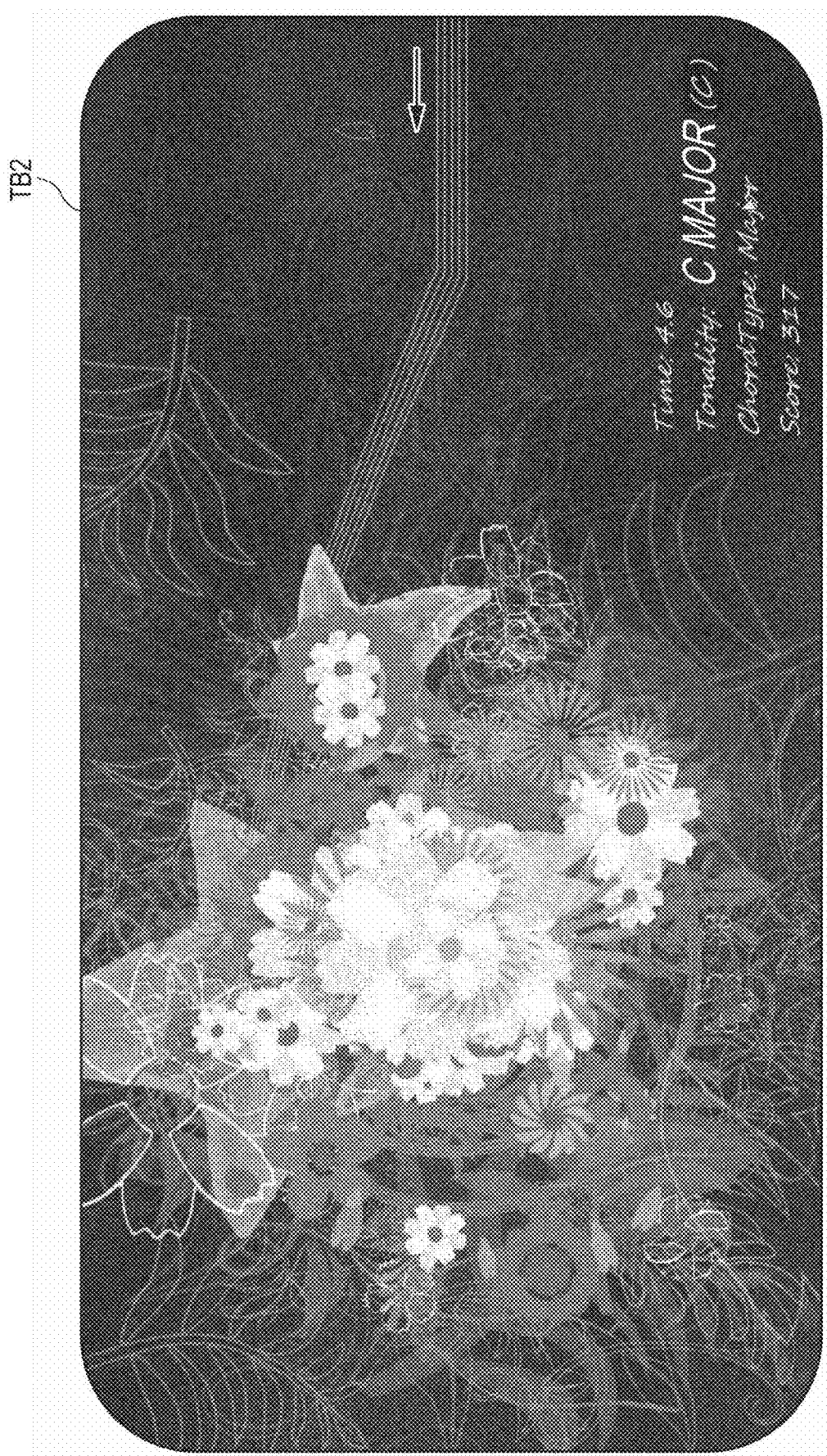
FIG. 8 is a view of an example of a second image according to the first embodiment of the present invention.

FIG. 8 is a view of an example of this second image.

As illustrated in FIG. 8, in the second image according to the present embodiment, a score indicating the progress of performance (direction of movement is indicated by an arrow) is spirally drawn and the first images output during the performance are arranged along the score.

According to the present embodiment, the second image includes a plurality of flower patterns and a plurality of leaf patterns, and at the end of the performance, an image like a bouquet is displayed on the display TB2.

That is, in the present embodiment, the second image including the first images output in the first image output process and spirally arranged (step S3) is output in the second image output process (step S5).

In this way, since the second image according to a result determined in the performance determination process (step S2) is displayed upon the end of performance, it is possible for the performer or the like to visually feel how is the performance as a whole.

In the above embodiment, the characters used for the first image and the second image are flowers and leaves, but the characters are not limited thereto and other characters may be used.

However, since the flowers and leaves readily express various scenes, such as sad scenes and pleasant scenes, it is easy to create images that match any of sad music and happy music, and it can be said that the flowers and leaves are characters suitable for various music.

On the other hand, in the above description, actual operation of the keys 10 by the performer to play music has been described, but the electronic musical instrument 1 has an automatic performance function on the basis of MIDI data. Thus, the information processing device TB may also be applied to such automatic performance.

In this case as well, since performance information (MIDI codes of the MIDI data) is sequentially transmitted from the electronic musical instrument 1 to the information processing device TB according to the progress of the performance, the processing performed by the processor TB5 is basically the same as the processing described above.

However, when the performance ends, data indicating the end of the performance is also transmitted. Therefore, the processing of step S4 may be used as the performance end determination process for determining the end of the performance when the reception of the performance information in the reception process is finished.

Second Embodiment

In the first embodiment, the information processing device TB uses the tablet mobile terminal separated from the electronic musical instrument 1, but the electronic musical instrument 1 itself may also serve as the information processing device.

A second embodiment is different from the first embodiment in that the electronic musical instrument 1 itself generates performance information, and the processor 80 of the electronic musical instrument 1 performs a generation process of generating performance information including pitch information according to a key 10 depressed by the performer, instead of the reception process of receiving input of the performance information including pitch information as described above.

It should be noted that the electronic musical instrument 1 itself has MIDI data for automatic performance, and for the automatic performance, the generation process serves as a reading process of reading an MIDI code (performance information including pitch information) corresponding to each tone of the MIDI data, and although detailed description thereof will be omitted, in this case, "generate" described below is desirably read as "read".

Therefore, the first image output process serves as a first image output process of outputting the first image according to the performance information at timing at which the performance information is generated. For example, the first image output process serves as a generation process of outputting and displaying the first image on the display 20 of the electronic musical instrument 1 or a generation process of outputting the first image to a display device (a TV monitor, a projector, etc.) separated from the electronic musical instrument 1 via the communication circuit 90 of the electronic musical instrument 1.

Note that, when the first image output process serves as the output process of outputting the first image to the display device (the TV monitor, the projector, etc.) separated from the electronic musical instrument 1 via the communication circuit 90 of the electronic musical instrument 1, needless to say, the first image is displayed on the display device (the TV monitor, a projector, etc.) separated from the electronic musical instrument 1.

Furthermore, the performance determination process serves as a performance determination process of determining at least any of the tonality, the chord type, and the pitch name on the basis of the generated performance information, and the performance end determination process serves as a performance end determination process of determining the end of performance on the basis of the end of generation of the performance information.

Furthermore, the second image output process serves as an output process of outputting and displaying the second image according to a result determined in the performance determination process to the display 20 of the electronic musical instrument 1 or an output process of outputting the second image to a display device (a TV monitor, a projector, etc.) separated from the electronic musical instrument 1 via the communication circuit 90 of the electronic musical instrument 1.

Note that, when the second image output process serves as the output process of outputting the second image to the display device (the TV monitor, the projector, etc.) separated from the electronic musical instrument 1 via the communication circuit 90 of the electronic musical instrument 1, needless to say, the second image is displayed on the display device (the TV monitor, a projector, etc.) separated from the electronic musical instrument 1.

The other points are substantially the same as those described in the first embodiment.

On the other hand, as a modification of the second embodiment, the information processing device TB separated from the electronic musical instrument 1 may store music data (MIDI data) to be operated similarly to the above-described electronic musical instrument 1 itself also serving as the information processing device, in the automatic performance.

That is, the information processing device TB separated from the electronic musical instrument 1 may be operated similarly to the above-described electronic musical instrument 1 itself in the reading process of reading the MIDI code (the performance information including pitch information) corresponding to each sound of the above MIDI data.

Although the information processing device (the information processing device TB and the electronic musical instrument 1 as an information processing device) according to the present invention has been described above on the basis of specific embodiments, the present invention is not limited to the above specific embodiments.

For example, in the first embodiment, the first image output process (step S3) and the second image output process (step S5) are configured to output and display the first image and the second image on the display TB2 included in the information processing device TB itself, but the present invention is not necessary to be limited to this description.

The first image output process (step S3) and the second image output process (step S5) may be an output process of outputting the first image and the second image on a display device (a TV monitor, a projector, etc.) separated from the information processing device TB connected via the communication circuit TB3 of the information processing device TB.

In this case, the first image and the second image are displayed on the display device (the TV monitor, the projector, etc.) separated from the information processing device TB. According to an embodiment of the present invention, whenever the performer designates a performance operator, the first image showing whether the performer designates an appropriate performance operator is displayed on the display. Thus, the performer can visually understand whether he/she appropriately designated the performance operator or not, in real time. Here, whether the appropriate performance operator is designated is determined on the basis of evaluation of, for example, beat regularity (whether a performance operator is designated at correct timing by the performer) or the correctness of chord progression (whether an appropriate combination of a plurality of performance operators is designated by the performer) by the processor. As a matter of course, whether a performance operator to be designated is designated by the performer may be evaluated on the basis of performance data stored in the memory. Furthermore, for example, after the end of playing a piece of music, the second image is displayed to show which tonality the music is played in, and the performer can visually understand a result of playing the piece of music. For example, when bright music is played, the second image has a bright color. On the other hand, in a case of dark music, the second image has a dark color. In addition, in the second image, a plurality of characters (materials) is collectively displayed in the vicinity of a certain position of the second image. That is, the processor controls a position in the second image to which the plurality of characters is output so that the plurality of characters arranged in the vicinity of the certain position has a density different from that of the plurality of characters arranged at another position different from the vicinity of the certain position. Therefore, the vicinity of the certain position is focused as a main position in the second image. Thus, the second image gives a clear impression to the performer without giving unclear impression. Accordingly, the performer who watches the second image is motivated to repeat playing music, compared with when the performer does not watch the second image.

Specific embodiments of the present invention were described above, but the present invention is not limited to the above embodiments, and modifications within the scope of the aims of the present invention are included in the present invention. It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is expressly intended that any and all or any combination of any two or more of the above-described embodiments and variations thereof can be considered within the scope of the present invention.

What is claimed is:

1. An information processing device comprising:
   a display; and
   a processor configured to execute the following processes:
   a reception process of receiving input of performance information including pitch information in response to operation of a performance operator of an electronic musical instrument by a performer of the electronic musical instrument, the performance operator designating a pitch, wherein the performance information is generated and received in the reception process each time the performance operator of the electronic musical instrument is operated by the performer to perform music,
   a first image output process of outputting on the display a first image according to the performance information received in the reception process,
   a performance determination process of determining at least any of tonality, a chord type, and a pitch name based on the performance information received in the reception process,
   a performance end determination process of determining whether performance ends, and
   a second image output process of outputting on the display a second image according to a result determined in the performance determination process when the end of performance is determined in the performance end determination process.

2. The information processing device according to claim 1, wherein:
   in the performance determination process, evaluation of playing music by the performer is determined based on the performance information received in the reception process, and
   in the first image output process, the processor outputs, as the first image, different images depending on a result of to the evaluation, whereby an image that is output as the first image according to a first result of the evaluation is different from an image that is output as the first image according to a second result of the evaluation that is different from the first result.

3. The information processing device according to claim 1, wherein the second image differs in at least brightness depending on the result of the determination in the performance determination process.

4. The information processing device according to claim 1, wherein:
   the performance information includes melody information and chord information,
   the first image includes a first character image according to the melody information and a second character image according to the chord information, and
   the first character image and the second character image are relevantly combined and displayed.

5. The information processing device according to claim 1, wherein:
   the performance information includes melody information and chord information,
   the first image includes a first character image according to the melody information and a second character image according to the chord information,
   the first character image includes a flower pattern character image,
   the second character image includes a leaf pattern character image, and
   the first character image and the second character image are relevantly combined and displayed.

6. The information processing device according to claim 1, wherein:
   the performance information includes melody information and chord information,
   the first image includes a first character image according to the melody information and a second character image according to the chord information,
   the first character image includes a flower pattern character image,
   the second character image includes a leaf pattern character image, and
   the first character image and the second character image are relevantly combined and displayed, and
   the second image includes the flower pattern character image and the leaf pattern character image.

7. The information processing device according to claim 1, wherein:
   the processor performs:
      a chord progression determination process of determining chord progression according to the performance information, and
      a trajectory pattern determination process of determining a trajectory pattern indicating positions at which the first image is to be displayed on the display in accordance with the chord progression determined in the chord progression determination process, and
   in the first image output process, the processor displays the first image at a position on the display from among the positions indicated in the trajectory pattern determined in the trajectory pattern determination process, in accordance with the chord progression determined in the chord progression determination process.

8. The information processing device according to claim 1, wherein:
   the performance information includes velocity information, and the first image output process is configured to output the first image in a size corresponding to the velocity information.

9. The information processing device according to claim 1, wherein when a pitch name is determined in the performance determination process, the first image output process is configured to output the first image corresponding to the determined pitch name.

10. The information processing device according to claim 1, wherein when a chord type is determined in the performance determination process, the first image output process is configured to output the first image corresponding to the determined chord type.

11. The information processing device according to claim 1, wherein:
the processor is configured to perform the first image output process a plurality of times to output a plurality of the first images, and
in the second image output process, the processor creates the second image by spirally arranging the plurality of first images such that the second image output in the second image output process includes the spirally arranged plurality of first images.

12. The information processing device according to claim 1, wherein when input of the performance information is not received for a certain period of time in the reception process, the processor determines that performance ends, in the performance end determination process.

13. A method for causing an information processing device including a display to perform the following processes:
a reception process of receiving input of performance information including pitch information in response to operation of a performance operator of an electronic musical instrument by a performer of the electronic musical instrument, the performance operator designating a pitch, wherein the performance information is generated and received in the reception process each time the performance operator of the electronic musical instrument is operated by the performer to perform music,
a first image output process of outputting on the display a first image according to the performance information received in the reception process,
a performance determination process of determining at least any of tonality, a chord type, and a pitch name on the basis of the performance information received in the reception process,
a performance end determination process of determining whether performance ends, and
a second image output process of outputting on the display a second image according to a result determined in the performance determination process when the end of performance is determined in the performance end determination process.

14. A non-transitory computer-readable storage medium for causing an information processing device including a display to execute the following processes:
a reception process of receiving input of performance information including pitch information in response to operation of a performance operator of an electronic musical instrument by a performer of the electronic musical instrument, the performance operator designating a pitch, wherein the performance information is generated and received in the reception process each time the performance operator of the electronic musical instrument is operated by the performer to perform music,
a first image output process of outputting on the display a first image according to the performance information received in the reception process,
a performance determination process of determining at least any of tonality, a chord type, and a pitch name on the basis of the performance information received in the reception process,
a performance end determination process of determining whether performance ends, and
a second image output process of outputting on the display a second image according to a result determined in the performance determination process when the end of performance is determined in the performance end determination process.

15. An electronic musical instrument comprising:
a performance operator;
a display; and
a processor performing the following processes:
a reception process of receiving input of performance information including pitch information in response to operation of the performance operator by a performer of the electronic musical instrument, the performance operator designating a pitch, wherein the performance information is generated and received in the reception process each time the performance operator of the electronic musical instrument is operated by the performer to perform music,
a first image output process of outputting on the display a first image according to the performance information received in the reception process,
a performance determination process of determining at least any of tonality, a chord type, and a pitch name on the basis of the performance information received in the reception process,
a performance end determination process of determining whether performance ends, and
a second image output process of outputting on the display a second image according to a result determined in the performance determination process when the end of performance is determined in the performance end determination process.

* * * * *